(12) United States Patent
Turner et al.

(10) Patent No.: US 11,326,645 B2
(45) Date of Patent: May 10, 2022

(54) METHODS AND SYSTEMS FOR AN ENGINE HOUSING ASSEMBLY WITH A REINFORCEMENT MEMBER

(71) Applicant: Ford Global Technologies, LLC, Dearborn, MI (US)

(72) Inventors: Paul Nigel Turner, Chelmsford (GB); Robert Davies, Braintree (GB); Dominic Timothy Evans, Sevenoaks (GB)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 16/723,383

(22) Filed: Dec. 20, 2019

(65) Prior Publication Data

US 2020/0217368 A1 Jul. 9, 2020

(30) Foreign Application Priority Data

Jan. 4, 2019 (GB) ...................................... 1900118

(51) Int. Cl.
*F02B 75/06* (2006.01)
*F16C 35/063* (2006.01)
(Continued)

(52) U.S. Cl.
CPC ........... *F16C 35/063* (2013.01); *F01M 11/02* (2013.01); *F02B 77/11* (2013.01); *F02F 7/0053* (2013.01);
(Continued)

(58) Field of Classification Search
CPC . F02F 7/0053; F16C 9/02; F16C 35/02; F16F 15/264; B22D 19/00
(Continued)

(56) References Cited

U.S. PATENT DOCUMENTS 4,465,029 A 8/1984 Matsumoto
5,743,230 A 4/1998 Yamazaki et al.
(Continued)

FOREIGN PATENT DOCUMENTS

DE 102005028588 A1 1/2007
DE 102009025693 A1 1/2010
(Continued)

OTHER PUBLICATIONS

Great Britain Intellectual Property Office, Combined Search and Examination Report under Sections 17 and 18(3) Issued in Application No. GB1900118.9, dated Jun. 24, 2019, 6 pages.

*Primary Examiner* — Long T Tran
*Assistant Examiner* — James J Kim
(74) *Attorney, Agent, or Firm* — Geoffrey Brumbaugh; McCoy Russell LLP

(57) ABSTRACT

Methods and systems are provided for an engine housing assembly. In one example, an engine housing assembly comprises an engine housing component, the housing component at least partially defining a first bore for receiving a first shaft and at least partially defining a second bore for receiving a second shaft; and a reinforcement member cast into the housing, the reinforcement member having a lower coefficient of thermal expansion than the housing component, wherein the reinforcement member at least partially surrounds the first and second bores. A method of manufacturing the engine housing assembly is also provided.

17 Claims, 7 Drawing Sheets

(51) Int. Cl.
  *F01M 11/02* (2006.01)
  *F02B 77/11* (2006.01)
  *F02F 7/00* (2006.01)
(52) U.S. Cl.
  CPC .......... *F02F 7/0068* (2013.01); *F02F 7/0095* (2013.01); *F01M 2011/026* (2013.01); *F16C 2360/22* (2013.01)
(58) Field of Classification Search
  USPC ..................................................... 123/192.2
  See application file for complete search history.

(56) References Cited

U.S. PATENT DOCUMENTS

| | | | |
|---|---|---|---|
| 5,788,381 A * | 8/1998 | Yamazaki | F02B 67/00 384/400 |
| 5,791,309 A | 8/1998 | Yamazaki et al. | |
| 6,286,474 B1 | 9/2001 | Downs et al. | |
| 6,382,165 B1 | 5/2002 | Hirose et al. | |
| 7,296,385 B2 | 11/2007 | Andra et al. | |
| 2005/0205751 A1* | 9/2005 | Utsumi | F02F 7/0046 248/674 |
| 2007/0065059 A1* | 3/2007 | Johnson | F02B 75/06 384/294 |
| 2007/0209628 A1* | 9/2007 | Natkin | F02F 7/0053 123/195 R |
| 2010/0186721 A1* | 7/2010 | Maezuru | F02B 75/048 123/48 B |
| 2011/0247581 A1* | 10/2011 | Trieschmann | F16F 15/264 123/192.2 |
| 2016/0312738 A1* | 10/2016 | Magro | F02F 7/0053 |
| 2017/0314507 A1* | 11/2017 | Ikehara | F02F 7/0053 |
| 2018/0245680 A1* | 8/2018 | Britzger | F16H 55/17 |
| 2019/0195168 A1* | 6/2019 | Lee | F02F 7/0053 |

FOREIGN PATENT DOCUMENTS

| | | |
|---|---|---|
| DE | 102009050628 A1 | 4/2011 |
| DE | 102013206780 A1 | 10/2013 |
| GB | 1222939 A | 2/1971 |
| KR | 970045011 A1 | 12/1995 |

\* cited by examiner

METHODS AND SYSTEMS FOR AN ENGINE HOUSING ASSEMBLY WITH A REINFORCEMENT MEMBER

CROSS REFERENCE TO RELATED APPLICATION

The present application claims priority to Great Britain Patent Application No. 1900118.9, entitled "ENGINE HOUSING ASSEMBLIES", and filed on Jan. 4, 2019. The entire contents of the above-listed application is hereby incorporated by reference for all purposes.

FIELD

The present description relates generally to engine housing assemblies configured to improve backlash between gears mounted on shafts supported by the engine housing assemblies.

BACKGROUND/SUMMARY

Components of modern engine assemblies, e.g. engine housing components, such as cylinder blocks, may be manufactured from aluminum. Aluminum is less dense than materials, such as steel, that have previously been used to manufacture the engine assembly components. Manufacturing components of engine assemblies from aluminum can therefore beneficially reduce the weight of the engine components.

However, aluminum has a greater coefficient of thermal expansion than materials that have previously been used to manufacture components of engine assemblies. The greater coefficient of thermal expansion can be detrimental to the performance of some components within the engine assembly.

In one example, the issues described above may be addressed by an engine housing assembly comprising an engine housing component, the housing component at least partially defining a first bore for receiving a first shaft and at least partially defining a second bore for receiving a second shaft and a reinforcement member cast into the housing component, the reinforcement member having a different, lower coefficient of thermal expansion than the housing component, wherein the reinforcement member at least partially surrounds the first and second bores. Alternatively, the reinforcement member may have a higher coefficient of thermal expansion than the housing component.

The reinforcement member may substantially surround, e.g. extend completely around an axis of, the second bore. The housing component may define a bearing structure for supporting a portion of a bearing for the first shaft. The bearing structure may be configured to extend around a portion of the circumference of the first shaft. The reinforcement member may extend around the bearing structure e.g. substantially completely around the bearing structure formed by the housing component.

The reinforcement member may comprise one or more threaded bores arranged for receiving fasteners to couple a bearing cap over the bearing support, e.g. such that the bearing support and the bearing cap together define the first bore. For example, a threaded bore may be provided on either side of the bearing structure. The bearing cap may be configured to support a remaining portion of the bearing, e.g. the portion not supported by the bearing structure of the housing component.

The reinforcement member may be substantially completely surrounded by the material of engine housing component, e.g. such that no part of the reinforcement member protrudes from the engine housing component. A thickness of material of the engine housing component may be provided over all or substantially all (e.g., greater than 50%) of the surfaces of the reinforcement member. For example, surfaces of the threaded bores of the reinforcement member may not be covered by the material of the engine housing component.

The reinforcement member may comprise a bearing engagement face which at least partially surrounds the first bore. The bearing engagement face may be configured to engage at least a portion of a bearing for supporting rotation of the first shaft.

The bearing engagement face may form an outer surface of the engine housing assembly.

The reinforcement member may further comprise an oil passage arranged to allow oil to be fed to one or more bearings on the first and/or second shafts through the reinforcement member. The reinforcement member may further comprise one or more further oil passages arranged to allow oil to be fed through the reinforcement member to other bearings on the first and/or second shafts.

The engine housing component may at least partially define a third bore for receiving a third shaft. The reinforcing member may be configured to at least partially surround the third bore.

An engine assembly may comprise the above-mentioned engine housing assembly. The engine assembly may further comprise the first shaft assembly. The first shaft assembly may comprise a first gear wheel. The engine assembly may further comprise the second shaft assembly. The second shaft assembly may comprise a second gear wheel configured to mesh with the first gear wheel.

The reinforcement member may have a coefficient of thermal expansion that is closer to the coefficient of thermal expansion of the first and/or second gear wheel than the thermal coefficient of the housing component is to the coefficient of thermal expansion of the first and/or second gear wheel. In other words, the difference between the coefficients of thermal expansion of the reinforcement member and first and/or second gear wheel may be less than the difference between the coefficients of thermal expansion of the housing component and the first and/second gears. For example, the coefficient of thermal expansion of the reinforcement member may be substantially equal to the coefficient of thermal expansion of the first and/or second gear wheel.

The engine assembly may further comprise a bearing cap. The bearing cap may be coupled to the reinforcement member such that the engine housing assembly and the bearing cap together define the first bore. The bearing cap may have a similar, e.g. the same, coefficient of thermal expansion to the reinforcement member. For example, the bearing cap may be made from a similar material to the reinforcement member. In one example, the bearing cap may be made from cast iron.

The first shaft may comprise a crankshaft or a camshaft. The second shaft may comprise an engine balance shaft or a camshaft.

The first gear wheel may have a lower coefficient of thermal expansion than the housing component. Additionally or alternatively, the second gear wheel may have a lower coefficient of thermal expansion than the housing component. The coefficient of thermal expansion of the first and/or second gear wheel may be substantially the same as the reinforcement member. The first and/or second gear wheels may be made from the same material as the reinforcement member.

According to another aspect of the present disclosure, there is provided a method of manufacturing an engine housing component assembly, the method comprising forming a reinforcement member for an engine housing component forming the engine housing component such that the reinforcement member is cast into the engine housing component, wherein the engine housing component at least partially defines a first bore for receiving a first shaft and at least partially defining a second bore for receiving a second shaft, wherein the reinforcement member at least partially surrounds the first and second bores and wherein the reinforcement member has a different, e.g. lower, coefficient of thermal expansion than the engine housing component. Alternatively, the reinforcement member may have a higher coefficient of thermal expansion than the engine housing.

Forming the engine housing component may comprise casting the engine housing component over the reinforcement member. Forming the engine housing component may further comprise machining the outer surfaces of the engine housing component.

The outer surfaces of the engine housing component may be machined such that a thickness, e.g. a non-zero thickness, of material of the engine housing component is provided over all, or substantially all, of the surfaces of the reinforcement member.

The engine housing component may define a bearing structure for supporting a portion of a bearing for the first shaft. The method may further comprise coupling a bearing cap to the engine housing component or reinforcement member such that the bearing cap and the bearing structure together define the first bore.

The reinforcement member may comprise a bearing engagement face formed on a portion of the reinforcing member which at least partially surrounds the first shaft. The outer surfaces of the engine housing component may be formed, e.g. machined, such that the bearing engagement face of the reinforcement member forms an outer surface of the engine housing assembly at least partially surrounding the first or second bore. The bearing engagement face may be configured to support the portion of the bearing.

The method may further comprise coupling a bearing cap to the engine housing component or reinforcement member such that the bearing cap and the reinforcement member together define the first bore. The method may further comprise machining the bearing cap and the reinforcement member to form the first bore. The bearing cap and the reinforcement member may be machined together, e.g. the bearing cap and the reinforcement member may be machined in a single machining operation. The bearing cap and the reinforcement member may be machined, e.g. reamed, together in order to improve the cylindricity of the first bore.

To avoid unnecessary duplication of effort and repetition of text in the specification, certain features are described in relation to only one or several aspects or embodiments of the invention. However, it is to be understood that, where it is technically possible, features described in relation to any aspect or embodiment of the disclosure may also be used with any other aspect or embodiment of the disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-6 are shown approximately to scale, however, other relative dimensions may be used if desired.

DETAILED DESCRIPTION

The following description relates to systems and methods for improving backlash sensitivity to a temperature change in an engine. An insert may be used to control a thermal differential expansion of a cylinder block housing material and other relative drive elements. In one example, the insert is an insert bridge. The insert bridge may comprise a bracing to maintain a structural integrity. Additionally, the insert bridge may comprise a ring or other similarly shaped component configured to hold the insert bridge securely. The ring may also comprise a split cap shape. In one example, a bearing or a cam cap may be bolted directly into the insert bridge which may form a tensional structure. The insert bridge may control an axial center to center location of both shafts which include a shaft driven via a power shaft of the engine. The insert bridge may be used as a thermal differential expansion control element, but may also additionally be used to form part of a parent bearing material.

In one example of the present disclosure, the insert bridge may be fully molded to a cylinder block or head and fully encompassed by material of the block or head to minimize bimetallic bending.

The gear set may comprise steel and the cylinder block, which contains a crankshaft bore and a balance shaft bore, may comprise aluminum. The insert bridge may comprise steel, which may be inserted into a cylinder block casting, that may connect a main bearing bore to the balance shaft bore. The bridge insert, which may alternatively comprise cast iron, may be comprise a coefficient of thermal expansion closer to the gear set than the cylinder block. As such, the bridge insert may locally constrain the growth of the gear set into the cylinder block. By doing this, a constant backlash setting may be maintained between the gears and thus help block any adverse noise, vibration, harshness (NVH) conditions.

Figure 1:
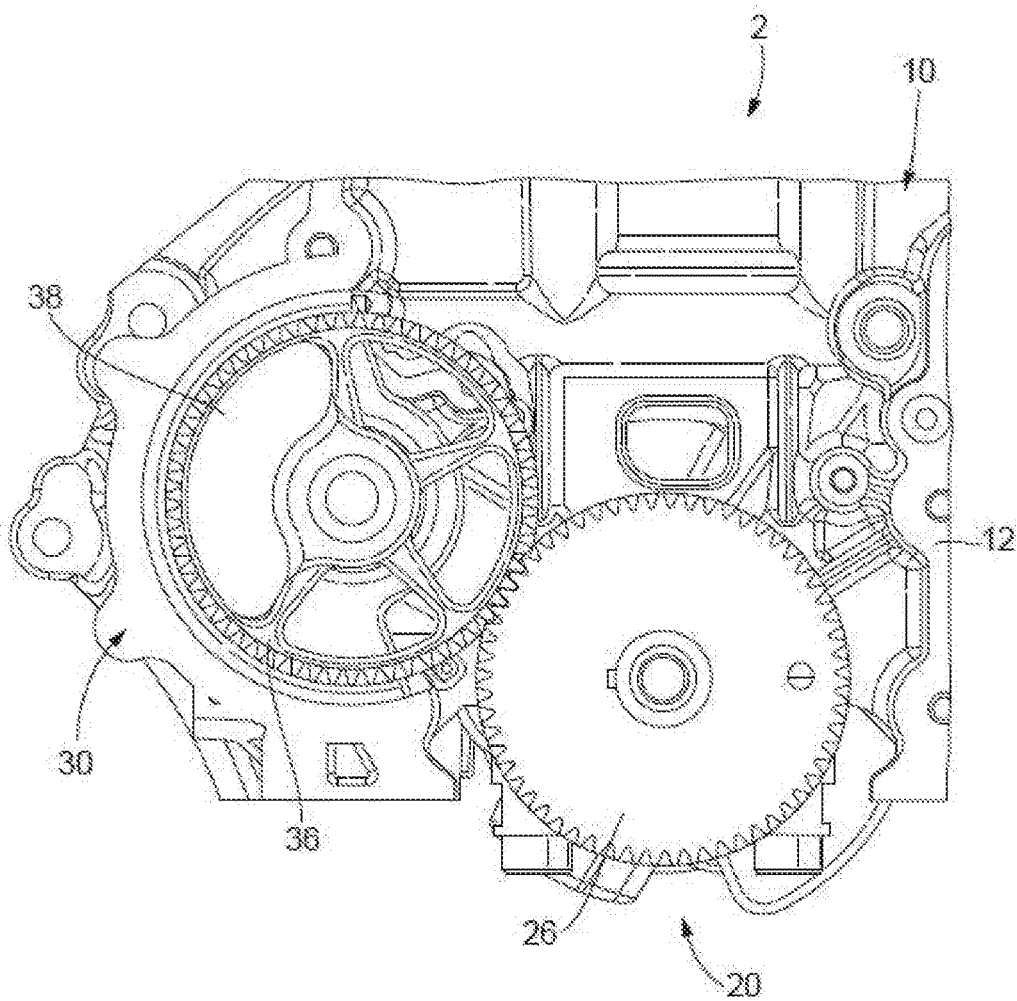
FIG. 1 illustrates a schematic side view of an engine assembly according to arrangements of the present disclosure.
Figure 2:
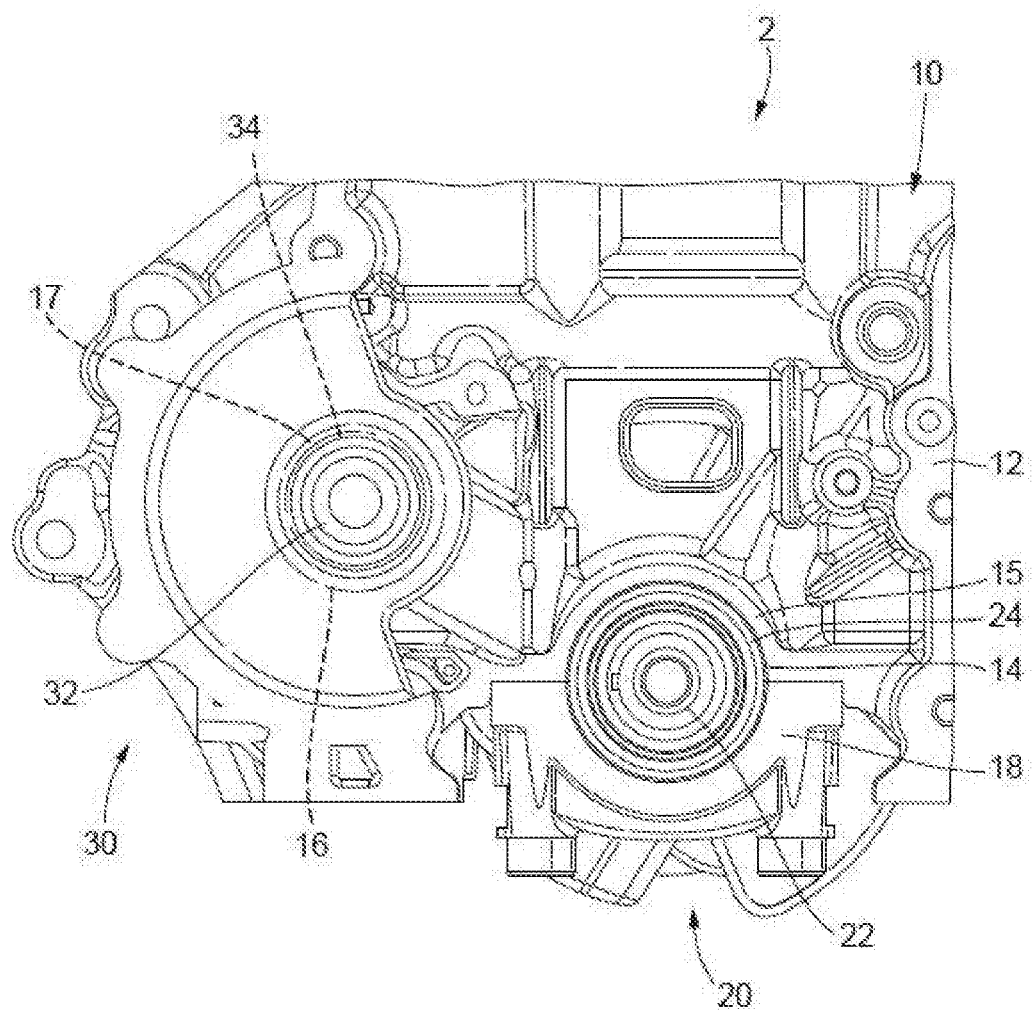
FIG. 2 illustrates a schematic side view of the engine assembly with first and second gears and eccentric mass of the shaft assemblies are omitted for clarity.
Figure 3:
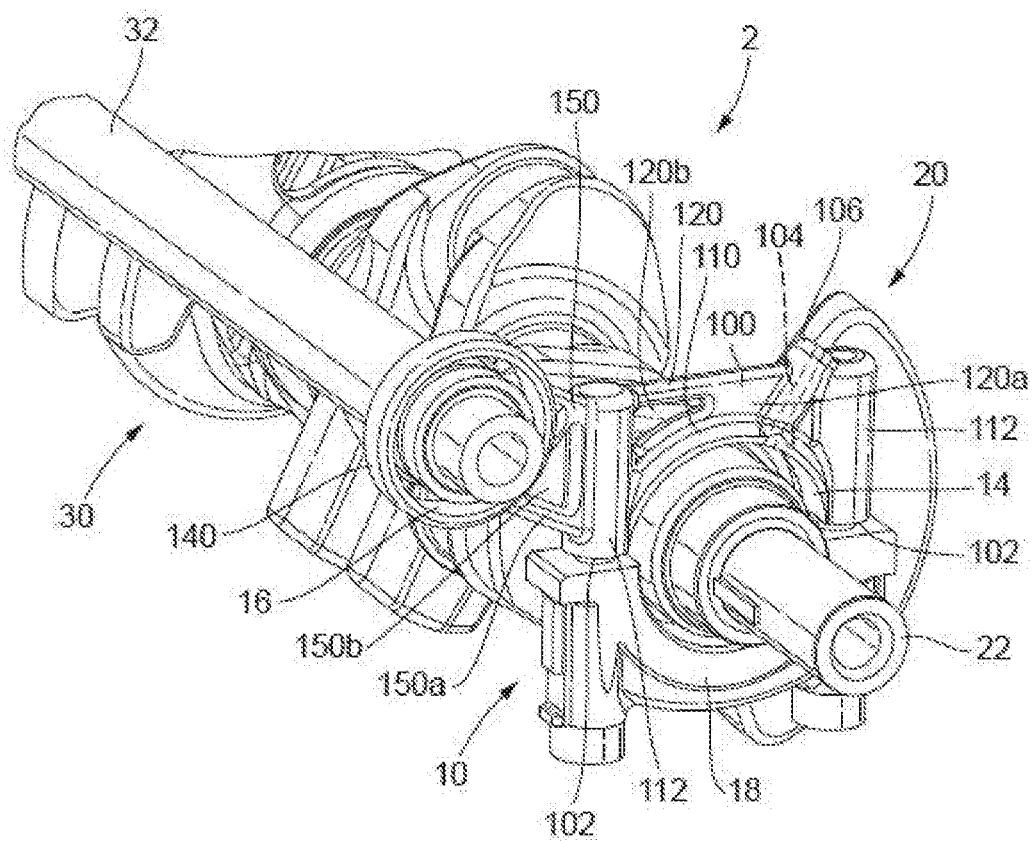
FIG. 3 illustrates a schematic perspective view of the engine assembly with the first and second gears, eccentric mass and the engine housing component omitted for clarity.
Figure 4:
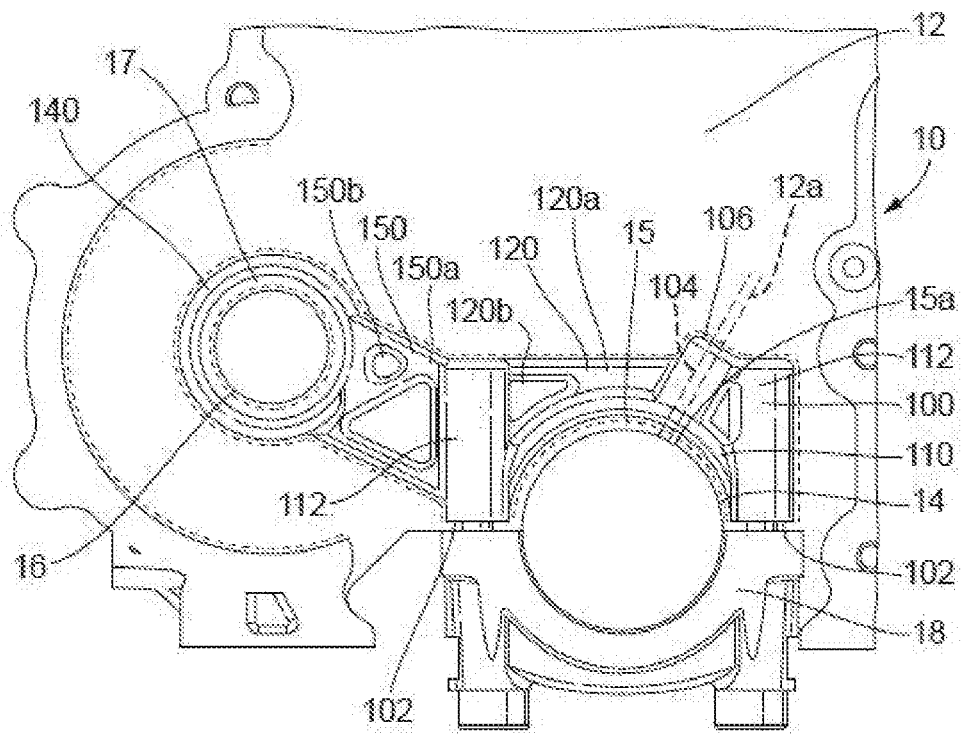
FIG. 4 illustrates a schematic, side sectional view of an engine housing assembly according to arrangements of the present disclosure.
Figure 5:
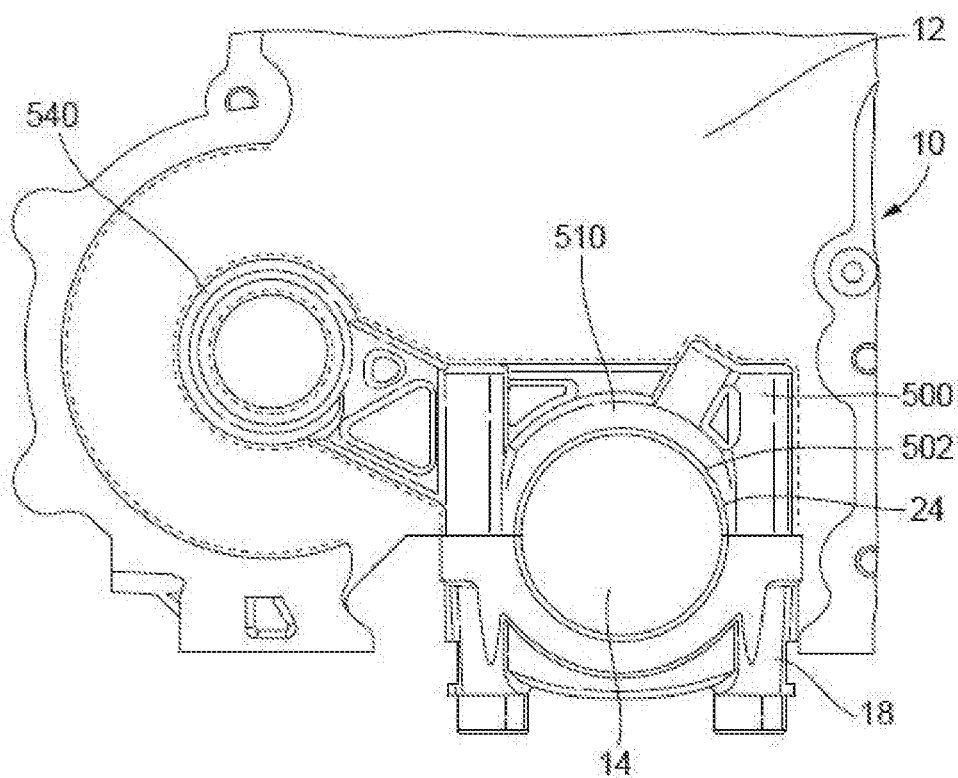
FIG. 5 illustrates a schematic, side sectional view of an engine housing assembly according to another arrangement of the present disclosure.
Figure 6:
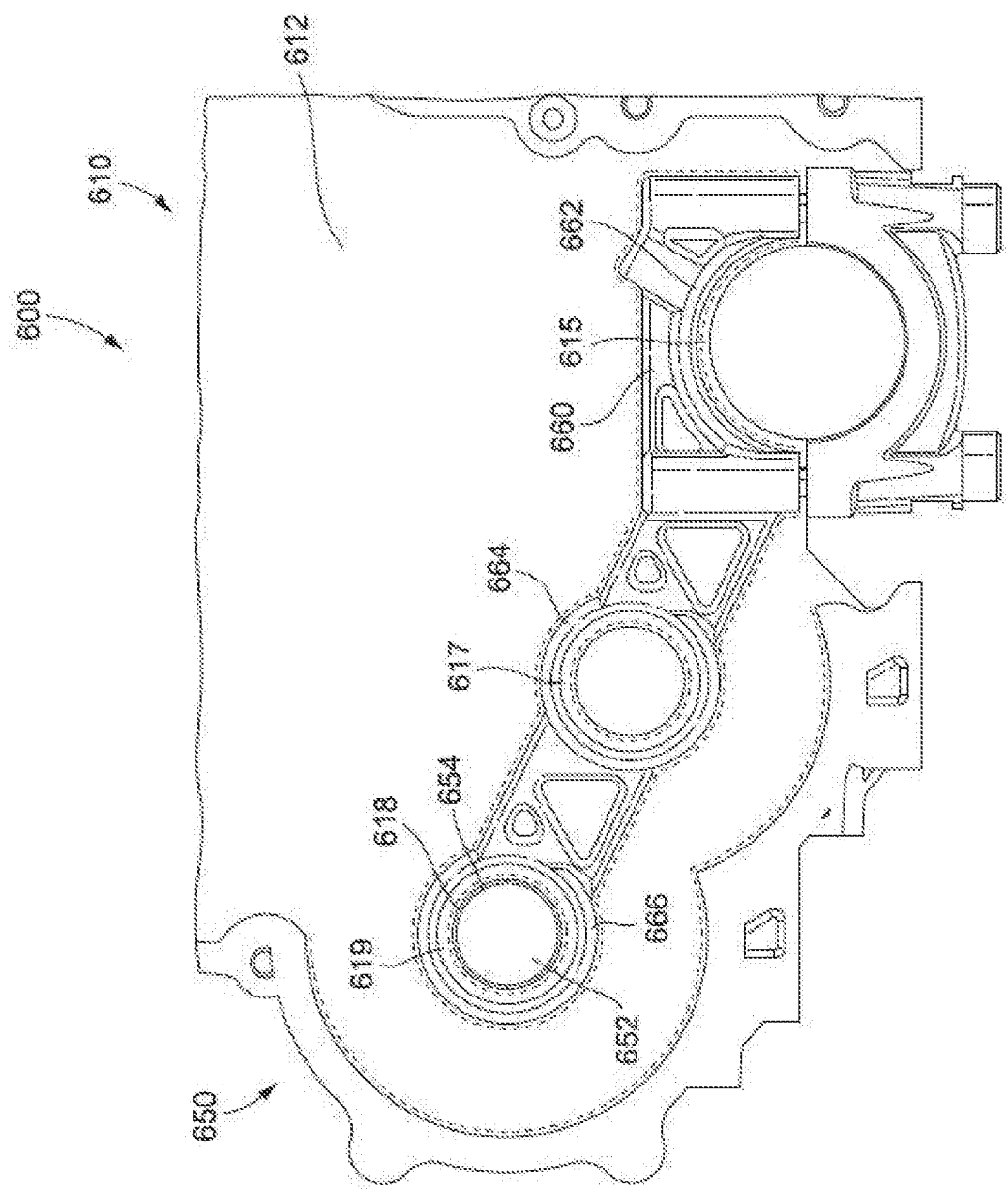
FIG. 6 illustrates a schematic, side sectional view of an engine housing assembly according to another arrangement of the present disclosure.
Figure 7:
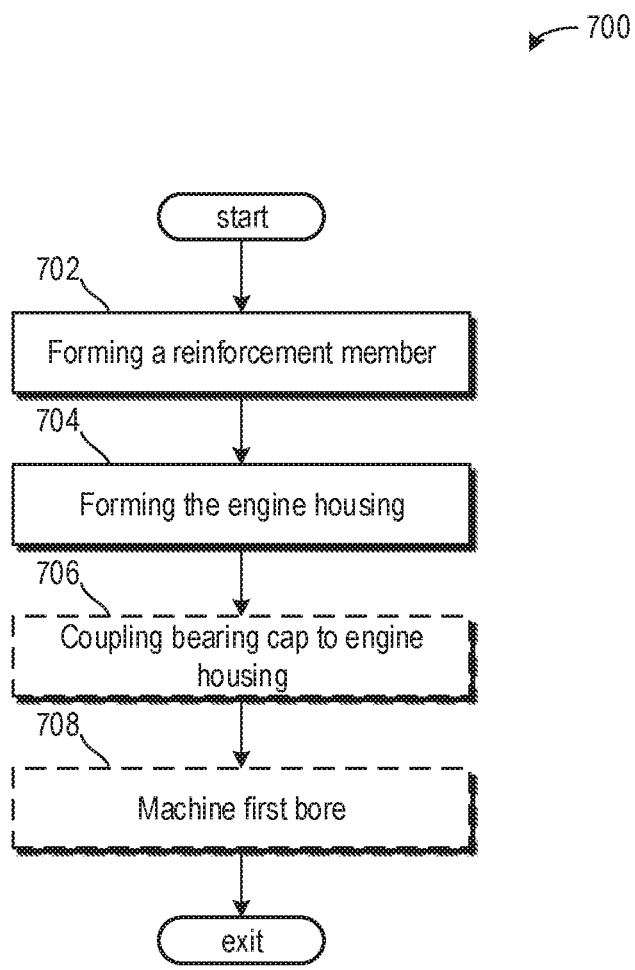
FIG. 7 illustrates a flow chart illustrating a method of manufacturing an engine housing assembly according to arrangements of the present disclosure

FIG. 1 illustrates a schematic side view of an engine assembly according to arrangements of the present disclosure. FIG. 2 illustrates a schematic side view of the engine assembly with first and second gears and eccentric mass of the shaft assemblies are omitted for clarity. FIG. 3 illustrates a schematic perspective view of the engine assembly with the first and second gears, eccentric mass and the engine housing component omitted for clarity. FIG. 4 illustrates a schematic, side sectional view of an engine housing assembly according to arrangements of the present disclosure. FIG. 5 illustrates a schematic, side sectional view of an engine housing assembly according to another arrangement of the present disclosure. FIG. 6 illustrates a schematic, side sectional view of an engine housing assembly according to another arrangement of the present disclosure. FIG. 7 illustrates a flow chart illustrating a method of manufacturing an engine housing assembly according to arrangements of the present disclosure with reference to FIGS. 1, 2, 3 and 4, an engine assembly 2, e.g. for a motor vehicle, comprises an engine housing assembly 10, a first shaft assembly 20, and a second shaft assembly 30.

The engine housing assembly 10 comprises an engine housing component 12. In the arrangement shown in FIGS. 1 to 4, the engine housing component 12 is manufactured from a first material, such as an aluminum alloy, having a first coefficient of thermal expansion. The first material may be selected in order to reduce the weight of the engine housing component, e.g. compared to engine housing components manufactured from an alternative material, such as a steel.

In the arrangement shown in FIGS. 1 to 4, the engine housing component 12 comprises a cylinder block. However, in other arrangements, the engine housing component may comprise any other housing of an engine assembly. For example, the engine housing component may comprise a cylinder head.

The engine housing component 12 at least partially defines a first bore 14 for receiving a first shaft 22 of the first shaft assembly 20. Additionally, the engine housing component 12 at least partially defines a second bore 16 for receiving a second shaft 32 of the second shaft assembly 30.

The engine housing component 12 comprises a first bearing structure 15 for supporting at least a portion of a bearing 24 of the first shaft assembly 20. The first bearing structure comprises a first bearing engaging surface 15a for engaging the bearing 24 or portion thereof. The engine housing component 12 further comprises a second bearing structure 17 for supporting at least a portion of a bearing 34 of the second shaft assembly 30. The second bearing structure 17 comprises a second bearing engaging surface 17a for engaging the bearing 34 or portion therefore. In the arrangement shown in FIGS. 1 to 4, the first bearing structure 15 and the first bearing engaging surface 15a extend partially, e.g. approximately half way, around the first shaft 22 and the second bearing structure 17 and the second bearing engaging surface 17a extend substantially completely surround the second shaft 32, e.g. the circumference of the second shaft. However, in other arrangements, the first bearing structure 15 may extend substantially completely around the first shaft 22 and/or the second bearing structure 17 may extend partially around the second shaft 32.

As depicted in FIGS. 1 to 4, the engine assembly 2 may further comprise a bearing cap 18 configured to couple to the engine housing assembly 10, e.g. at the first bearing structure 15. The bearing cap 18 is configured to at least partially define the first bore 14. The bearing cap 18 is configured to support at least a portion of the bearing 24 of the first shaft assembly 20. In the arrangement depicted, the engine housing component 12 and the bearing cap 18 together define the first bore 14. Accordingly, the engine housing assembly 10 and the bearing cap 18 substantially surround the first shaft 22 when the engine assembly 2 is assembled.

In the arrangement shown in FIGS. 1 to 4, the first shaft 22 comprises a crankshaft and the second shaft 32 comprises a balance shaft of the engine assembly 2. The balance shaft 32 comprises one or more eccentric masses 38 (depicted in FIG. 1). The balance shaft 32 is configured such that, when the balance shaft 32 is rotated at a predetermined speed relative to the crankshaft 22, the inertial forces generated by virtue of the rotation of the eccentric masses 38 balance vibrations of the engine assembly 2.

In other arrangements, the first and second shafts 22, 32 may be any other shafts received within respective bores of an engine housing component. For example, the first and/or second shaft may comprise a cam shaft or a shaft for a fuel pump of the engine assembly.

As shown in FIG. 1, the first and second shaft assemblies 20, 30 comprise first and second gear wheels 26, 36 respectively, which are supported by the shaft 22, 32 of the corresponding shaft assembly 20, 30. The first and second gear wheels 26, 36 are meshed in order to transmit torque between the first and second shafts 22, 32. For example, when the first shaft 22 is the crankshaft and the second shaft 32 is the balance shaft, torque is transferred to the balance shaft from the crankshaft, such that rotation of the balance shaft is driven synchronously by the crankshaft.

In the arrangement shown in FIGS. 1 to 4, the first and second gear wheels 26, 36 are manufactured from a second material, such as a steel, having a second coefficient of thermal expansion. The second material may be selected for manufacturing the first and second gear wheels 26, 36 due to a high hardness and/or toughness of the material. The second material may be selected such that wear of the gear wheels 26, 36 during their operation is reduced, e.g. compared to gear wheels manufactured from another material, such as an aluminum alloy.

The second coefficient of thermal expansion may be different from the first coefficient of thermal expansion. Accordingly, when the temperature of the engine assembly 2 increases, e.g. during operation of the engine assembly, the material of the engine housing component 12 may expand a different amount compared to the material of the first and second gear wheels 26, 36. For example, in the arrangement depicted in FIGS. 1 to 4, the second coefficient of thermal expansion is less than the first coefficient of thermal expansion and the material of the engine housing component 12 expands more than the material of the first and second gear wheels 26, 36 when the temperature of the engine assembly 2 increases.

In other arrangements, the second coefficient of thermal expansion may be greater than the first coefficient of thermal expansion and the material of the engine housing component 12 may expand less than the material of the first and second gear wheels 26, 36 when the temperature of the engine assembly 2 increases.

If the distance between the first and second bores 14, 16 is permitted to expand by a greater amount than the combination of expansions of the radii of the first and second gear wheels 26, 36, a clearance, or backlash, between teeth of the gear wheels may be increased, which may increase wear of the first and/or second gear wheels 26, 36 during operation of the engine assembly 2.

Conversely, if the radii of the first and second gear wheels expand by a greater amount than the distance between the first and second bores 14, the clearance, or backlash, between the teeth of the gear wheel may be reduced, which may lead to undesirable vibrations, such as gear whine, and increased wear of the first and/or second gear wheels 26, 36.

If the first and/or second gear wheels 26, 36 become worn, the efficiency with which torque is transferred between the first and second shafts 22, 32 may be reduced. Additionally or alternatively, wear of the first and/or second gear wheels may lead to vibrations of the first and second shaft assemblies 20, 30 during operation of the engine assembly 2 or increase the magnitude of existing vibrations. Furthermore, wear of the first and/or second gear wheels 26, 36 may lead to a difference in phase angle between the first and second shafts 22, 32. When the second shaft 32 comprises a balance shaft, a difference in phase angle between the shafts may reduce the efficacy with which vibrations are balanced.

As shown in FIGS. 3 and 4, the engine housing assembly 10 further comprises a reinforcement member 100, which is cast into the engine housing component 12. The reinforcement member at least partially surrounds the first and second bores 14, 16, e.g. at least partially extends around axes of the first and second bores.

In the arrangement shown in FIGS. 1 to 4, the reinforcement member 100 comprises a first portion 110 configured to partially surround the first bore 14. In particular, the first portion 110 of the reinforcement member 100 extends around the first bearing structure 15.

As depicted, the reinforcement member 100 may comprise a first reinforcement portion 120 configured to resist deformations of the first portion. The reinforcement portion 120 comprises one or more stiffening features 120*a*, such as ribs or webs, for stiffening the first portion 110 of the reinforcement member 100. As depicted, one or more openings 120*b* may be formed in or between the stiffening features 120*a*, which may become filled with the material of the engine housing component 12 when the engine housing component 12 is cast.

As depicted, the reinforcement member 100 further comprises a second portion 140 configured to substantially surround the second bore 16, e.g. an axis of the second bore 16. For example, the second portion 140 of the reinforcement member 100 may extend around, e.g. substantially completely around, the second bearing structure 17. In other arrangements, the first portion 110 of the reinforcement member 100 may extend completely around the first bore 14 and/or the second portion 140 may extend partially around the second bore 16, for example depending on the extents to which the first and second bearing structures 15, 17 surround the first and second bores 14, 16 respectively.

The reinforcement member 100 further comprises a second reinforcement portion 150 extending between the first and second and second portions 110, 140. The second reinforcement portion 150 is configured to resist displacements of the first and second portions 110, 130 relative to one another, e.g. due to thermal expansion of the engine housing component 12, as described below. As illustrated, the second reinforcement portion 150 extends at an angle from the first portion 110 to the second portion 140.

The second reinforcement portion 150 may be configured similarly to the first reinforcement portion 120 and may comprise one or more stiffening features 150*a*, configured to create a stiff connection between the first and second portions. One or more openings 150*b* may be formed in or between the stiffening features 150*a*, which may become filled with the material of the engine housing component 12 when the engine housing component 12 is cast.

The reinforcement member 100 is manufactured from a third material, such as a steel, having a third coefficient of thermal expansion. The third coefficient of thermal expansion is different from the first coefficient of thermal expansion.

In the arrangement shown in FIGS. 1 to 4, the third coefficient of thermal expansion is less than the first coefficient of thermal expansion. However, in other arrangements, the third coefficient of thermal expansion may be greater than the first coefficient of thermal expansion The third coefficient of thermal expansion may be closer to the second coefficient of thermal than the first coefficient of thermal expansion is to the second coefficient of thermal expansion. In other words, a difference between the second and third coefficients of thermal expansion may be less than a difference between the first and second coefficients of thermal expansion. For example, the third coefficient of thermal expansion may be substantially equal to the second coefficient of thermal expansion. In some arrangements, the second and third materials may be the same material.

Said another way, a first value is equal to a difference between the third coefficient of thermal expansion and the second coefficient of thermal expansion. A second value is equal to a difference between the second coefficient of thermal expansion and the first coefficient of thermal expansion. In one example, the first value is less than the second value. As such, the reinforcement member may expand/contract in response to thermal fluctuations more similarly to the gear wheels compared to the bores.

In the arrangement shown, when the temperature of the engine housing assembly 10 changes, e.g. increases, the volume of the material between the first and second bearing structures 15, 17 of the engine housing component 12 changes, e.g. expands, which forces the positions of the first and second bearing structures 15, 17 apart. However, because the third coefficient of thermal expansion is less that the first coefficient of thermal expansion, the reinforcement member 100, e.g. the second reinforcement portion 150, expands less than the engine housing component, e.g. the portion of the engine housing component between the first and second bores 14, 16. The reinforcement member 100 therefore acts to constrain relative movements of the first and second bores 14, 16 and bearing structure 15, 17 due to thermal expansion of the engine housing component 12. Accordingly, the distance between central axes of the first and second shafts 22, 32 varies less due to thermal expansion of the engine housing assembly 10 compared to in other engine assemblies in which the engine housing assembly does not comprise a reinforcement member 100.

Alternatively, in arrangements in which the third coefficient of thermal expansion is greater than the first coefficient of thermal expansion, the reinforcement member 100, when the temperature of the engine housing assembly changes, e.g. increases, the reinforcement member 100 acts to increase relative movements of the first and second bores 14, 16 and bearing structure 15, 17.

In either case, because the third coefficient of thermal is expansion is closer to the second coefficient of thermal expansion than the first coefficient of thermal expansion is to the second coefficient of thermal expansion, changes in the clearance, e.g. backlash between the first and second gear wheels is reduced.

In some arrangements, e.g. in which the third coefficient of thermal expansion is substantially equal to the second coefficient of thermal expansion, the relative movements of the first and second bores 14, 16 due to thermal expansion of the engine housing assembly 10 may be substantially equal to the combined thermal expansion of the radii of the first and second gear wheels 26, 36. Hence, backlash between the first and second gear wheels 26, 36 may be substantially unchanged as the temperature of the engine assembly 10 changes, e.g. increases.

The reinforcement member 100 may comprise one or more bores, e.g. threaded bores 102, configured to receive fasteners for coupling the bearing cap 18 to the engine housing assembly 10 such that the bearing cap 18 at least partially defines the first bore 14. The threaded bores 102 may be formed in cylindrical pillars 112, which may be formed at either side of the first portion 110. In this way, the bearing cap 18 can be coupled to the engine housing assembly across the first portion 110 of the reinforcement member 100 and across the first bearing structure 15 of the engine housing component 12. As depicted, the first reinforcement portion 120 may extend across the first portion 110 between the cylindrical pillars 112 and may act to resist deformations of the pillars 112 relative to the first portion 110.

The bearing cap 18 may be made from a material having a coefficient of thermal expansion substantially equal to the second or third coefficients of thermal expansion. For example, the bearing cap 18 may be manufactured from a cast iron or steel. In some arrangements, the bearing cap may be made from substantially the same material as the reinforcement member 100 and/or the gear wheels 26, 36.

As shown in FIGS. 3 and 4, the reinforcement member 100 may further comprise a lubricant passage 104 for permitting lubricant to flow through the structure of the reinforcement member 100 to reach the bearing 24 of the first shaft assembly 20. The lubricant passage 104 may be formed through a boss 106 formed on the first portion 110 of the reinforcement member 100. The lubricant passage 104 may be configured to align with a corresponding lubricant passage 12a formed in the engine housing component 12 for supplying lubricant to the bearing 24 of the first shaft assembly 20. In one example, a direction of lubricant flow through the lubricant passage 104 is angled to the second reinforcement portion 150. In one example, the direction of lubricant flow is perpendicular to the second reinforcement portion 150. Each of the lubricant passage 104 and the second reinforcement portion 150 extend from a side of the first reinforcement portion 120 away from the bearing portion 18.

In other arrangements, the lubricant passage 104 and the boss 106 may be configured to allow a flow of lubricant to pass through the reinforcement member 100 to reach the bearing 34 of the second shaft assembly 30. Alternatively, a further boss and further lubricant passage may be provided for allowing lubricant to flow through the reinforcement member 100 to reach the bearing 34 of the second shaft assembly 30, in addition to the lubricant passage 104 and boss 106.

As depicted in FIGS. 1 to 4, the reinforcement member 100 may be cast into the engine housing component 12 such that the reinforcement member 100 is completely surrounded by the material of the engine housing component 12, e.g. such that no part of the reinforcement member protrudes from the engine housing component. In other words, a thickness of material, e.g. a non-zero thickness of material, of the engine housing component 12 may be provided over substantially all of the surfaces, e.g. exterior surfaces, of the reinforcement member 100. It will be appreciated that the threaded bores 102 of the reinforcement member 100 may not be surrounded by the material of the engine housing component 12 and an opening may be formed in the engine housing component 12 to allow the fasteners to be inserted into threaded bores 102.

With reference to FIG. 5, in another arrangement of the disclosure, a reinforcement member 500 may comprise a bearing engagement face 502, which may be formed on a first portion 510 of the reinforcement member 500 that at least partially surrounds the first bore 14 of the engine housing. The engine housing assembly 10 is configured such that the bearing engagement face 502 forms an outer surface of the engine housing assembly 10. In other words, the bearing engagement face 502 is not covered by the material of the engine housing component 12.

The bearing engagement face 502 at least partially surrounds the first bore 14 and is configured to engage the bearing 24 of the first shaft assembly 20. The reinforcement member, e.g. the first portion 510 of the reinforcement member, is thereby configured to support at least a portion of the bearing 24, e.g. at the bearing engagement face 502. In the arrangement shown in FIG. 5, the bearing engagement face 502 is configured to engage the portion of the bearing 24 that engages the first bearing engaging surface 15a of the engine housing component 12 depicted in FIGS. 1 to 4. Accordingly, the reinforcement member 500 is configured to support the portion of the bearing 24 supported by the engine housing component depicted in FIGS. 1 to 4.

As depicted in FIG. 5, the bearing cap 18 is configured to support at least a portion of the bearing 24. In the arrangement shown in FIG. 5, the bearing cap is configured to support the portion of the bearing not supported by the reinforcement member 500 such that the bearing 24 is supported by the bearing cap 18 and the reinforcement member 500.

In other arrangements, the bearing engagement face 502 may be formed on a second portion 540 of the reinforcement member arranged to at least partially surround the second bore 16. In such arrangements, the bearing engagement face 502 may be configured to engage, e.g. directly engage, the bearing 34 of the second shaft assembly 30. Accordingly, the reinforcement member 500, e.g. the second portion 540 of the reinforcement member, may be configured to support the bearing 34 of the second shaft assembly 30. Alternatively, the reinforcement member 500 may comprise a further bearing engagement face (in addition to the bearing engagement face 502) formed on the second portion and configured to engage the bearing 34 of the second shaft assembly 30.

In one example, the bearing engagement face 502 and the further bearing engagement face may comprise a material similar to the reinforcement member 500. As described above, the material may be steel or cast iron. In one example, the material is not aluminum and/or is different than a material of the cylinder block.

With reference to FIG. 6, in another arrangement of the disclosure, an engine assembly 600 may further comprise a third shaft assembly 650 and an engine housing assembly 610 of the engine assembly 600 may at least partially define a third bore 618 for receiving a third shaft 652 of the third shaft assembly 650. The engine housing assembly 610 may comprise a third bearing structure 619 configured to support a bearing 654 of the third shaft assembly 650.

As depicted in FIG. 6, a reinforcement member 660 of the engine housing assembly 610 may comprise a third portion 666 configured to at least partially surround the third bore 618, for example, the reinforcement member 660 may extend around the third bearing structure 619. In this way, the reinforcement member 660 may be configured to limit thermal growth of the engine housing assembly between the second and third and/or first and third bores in the same way as between the first and second bores.

In the arrangement shown in FIG. 6, the reinforcement member 660 is cast into the engine housing component 612, such that the reinforcement member 660 is completely surrounded by the material of the engine housing component 612, and bearing structures 615, 617, 619 of the engine housing component 612 support the bearings of the first, second and third shaft assemblies respectively. However, in other arrangements, the first, second and/or third portions 662, 664, 666 of the reinforcement member 660 may comprise bearing engagement faces configured to engage, e.g. directly engage, the respective bearings, such that one or more of the bearings are supported by the reinforcement member 660.

In further arrangements, the engine housing assembly may be configured to at least partially define any other number of shaft bores and may comprise corresponding bearing structures of supporting bearings of shafts received within the bores. In such arrangements, the reinforcement member provided within the engine housing assembly may be configured to at least partially surround any number of the bores for limiting thermal growths of the engine housing assembly between the bores. In such arrangements, the reinforcement member may comprise any desirable number of bearing engagement faces for engaging, e.g. directly engaging, bearings at the shaft bores.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

With reference to FIG. 7, the engine housing assembly 10, 610 according to arrangements of the present disclosure may be manufactured according to a method 700. The method 700 comprises a first step 702 in which a reinforcement member for an engine housing component is formed. The reinforcement member may be formed using a casting process. Alternatively, the reinforcement member may be formed from powdered metal using a powder metallurgy process, such as a sintering process. The reinforcement member may be manufactured such that a surface roughness of the reinforcement member is greater than a threshold roughness, in order to increase contact area between the reinforcement member and the engine housing component.

The method 700 proceeds to 704, in which the engine housing component is formed such that the reinforcement member is embed within, e.g. cast into the engine housing component, e.g. to form the engine housing assembly.

The method 700 may optionally proceed to 706, in which the bearing cap 18 is coupled to the engine housing assembly, such that a bore, e.g. the first bore, is defined by the engine housing assembly, e.g. the first bearing structure 15 or the bearing engagement face 502, and the bearing cap 18.

The method 700 may optionally proceed to 708, which comprises a machining step, in which the first bore is machined, e.g. reamed, in order to improve the cylindricity of the first bore. When the material of the engine housing component surround substantially all of the faces of the reinforcement member, such that the bearing support 15 of the engine housing component 12 engages the bearing 24, the machining operation performed during the machining step may be a mixed metal machining as the engine housing component is manufactured from a different material from the bearing cap 18. Performing a mixed metal machining operation may be more complex than a single metal machining operation, as it may be desirable to operate using different tool speeds and/or different feed rates when machining the different materials.

Conversely, when the bearing engagement face 502 of the reinforcement member 500 forms an outer surface of the engine housing assembly 10 and is configured to engage the bearing 24, the machining operating performed during the machining step may be a single metal machining step, as the reinforcement member 500 may be manufactured from substantially the same material as the bearing cap 18. Hence, when the reinforcement member is configured such that the bearing engagement face 502 forms an outer surface of the engine housing assembly 10, the machining operation performed during the machining step may be simplified.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

In this way, a longevity and an efficiency of a gear set may be enhanced. An insert may comprise a material with a thermal coefficient closer to the gear set than a material of a cylinder block. The technical effect of more closely matching a thermal coefficient of the gear set with the insert than with the cylinder block is to maintain a backlash setting between the gears and block NVH conditions.

An embodiment of an engine housing assembly comprising an engine housing component at least partially defining a first bore for receiving a first shaft and at least partially defining a second bore for receiving a second shaft and a reinforcement member cast into engine the housing component, the reinforcement member having a different coefficient of thermal expansion from the housing component, wherein the reinforcement member at least partially surrounds the first and second bores.

A first example of the engine housing further comprises where the engine housing component defines a bearing structure for supporting a portion of a bearing for the first shaft, wherein the reinforcement member extends around the bearing structure.

A second example of the engine housing, optionally including the first example, further comprises where the reinforcement member comprises a threaded bore arranged for receiving fasteners to couple a bearing cap over the bearing support, such that the bearing support and the bearing cap together surround the first bore.

A third example of the engine housing, optionally including one or more of the previous examples, further comprises where the reinforcement member is completely surrounded by a material of engine housing component.

A fourth example of the engine housing, optionally including one or more of the previous examples, further comprises where the reinforcement member comprises a bearing engagement face which at least partially surrounds the first bore, wherein the bearing engagement face is configured to engage a bearing for supporting rotation of the first shaft.

A fifth example of the engine housing, optionally including one or more of the previous examples, further comprises where the reinforcement member further comprises an oil passage arranged to allow oil to be fed to a bearing on the first or second shaft through the reinforcement member.

A sixth example of the engine housing, optionally including one or more of the previous examples, further comprises where the engine housing component further at least partially defines a third bore, and wherein the reinforcement member at least partially surrounds the third bore.

A seventh example of the engine housing, optionally including one or more of the previous examples, further comprises where the third bore is configured to receive a third shaft, wherein the first shaft, the second shaft, and the third shaft include a crankshaft, a camshaft, and an engine balance shaft.

An embodiment of an engine assembly comprising an engine housing component at least partially defining a first bore for receiving a first shaft and at least partially defining a second bore for receiving a second shaft, wherein a first shaft assembly comprises a first gear wheel, and a second shaft assembly comprises a second gear wheel configured to mesh with the first gear wheel and a reinforcement member cast into engine the housing component, the reinforcement member having a different coefficient of thermal expansion from the housing component, wherein the reinforcement member at least partially surrounds the first and second bores.

A first example of the engine assembly further comprises where the coefficient of thermal expansion of the reinforcement member is closer to a coefficient of thermal expansion of the first and second gear wheels than the coefficient of thermal expansion of the engine housing component is to the coefficient of thermal expansion of the first and second gear wheel.

A second example of the engine assembly, optionally including the first example, further includes where the first shaft comprises a crankshaft or a camshaft, wherein the second shaft comprises an engine balance shaft or a camshaft.

A third example of the engine assembly, optionally including one or more of the previous examples, further includes where the first gear wheel and the second gear wheel have a lower coefficient of thermal expansion than the engine housing component.

A fourth example of the engine assembly, optionally including one or more of the previous examples, further includes where the reinforcement member comprises a coefficient of thermal expansion closer to a coefficient of thermal expansion of the first gear wheel and the second gear wheel than the engine housing component.

A fifth example of the engine assembly, optionally including one or more of the previous examples, further includes where the first gear wheel, the second gear wheel, and the reinforcement member comprise a first material, and wherein the engine housing component comprises a second material, wherein the first material is different than the second material.

A sixth example of the engine assembly, optionally including one or more of the previous examples, further includes where the first material is steel and the second material is cast iron.

An embodiment of a method of manufacturing an engine housing assembly, the method comprising fabricating a reinforcement member for an engine housing component, fabricating the engine housing component with the reinforcement member cast into the engine housing component, wherein the engine housing component at least partially defines a first bore for receiving a first shaft and at least partially defines a second bore for receiving a second shaft, wherein the reinforcement member at least partially surrounds the first and second bores, and wherein the reinforcement member has a different coefficient of thermal expansion from the engine housing component.

A first example of the method further includes where fabricating the engine housing component further comprises casting the engine housing component over the reinforcement member and machining the outer surfaces of the engine housing component.

A second example of the method, optionally including the first example, further includes where the engine housing component defines a bearing structure for supporting a portion of a bearing for the first shaft, further comprising coupling a bearing cap to the engine housing component or the reinforcement member, wherein the bearing cap and the bearing structure together define the first bore.

A third example of the method, optionally including one or more of the previous examples, further includes where outer surfaces of the engine housing component are machined such that a bearing engagement surface of the reinforcement members forms an outer surface of the engine housing assembly at least partially surrounding the first or second bore.

A fourth example of the method, optionally including one or more of the previous examples, further includes where coupling a bearing cap to the engine housing component or reinforcement member where the bearing cap and the reinforcement member together define the first bore; and machining the bearing cap and the reinforcement member to form the first bore.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine housing assembly comprising:
an engine housing component at least partially defining a first bore for receiving a first shaft and at least partially defining a second bore for receiving a second shaft; and
a reinforcement member cast into the engine housing component, the reinforcement member having a different coefficient of thermal expansion from the housing component, wherein the reinforcement member at least partially surrounds the first and second bores,
wherein the engine housing component further at least partially defines a third bore,
wherein the reinforcement member at least partially surrounds the third bore,
wherein the third bore is configured to receive a third shaft, and
wherein the first shaft, the second shaft, and the third shaft include a crankshaft, a camshaft, and an engine balance shaft.

2. The engine housing assembly of claim 1, wherein the engine housing component defines a bearing structure for supporting a portion of a bearing for the first shaft, wherein the reinforcement member extends around the bearing structure.

3. The engine housing assembly of claim 2, wherein the reinforcement member comprises a threaded bore arranged for receiving fasteners to couple a bearing cap over the bearing support, such that the bearing support and the bearing cap together surround the first bore.

4. The engine housing assembly of claim 1, wherein the reinforcement member is completely surrounded by the engine housing component.

5. The engine housing assembly of claim 1, wherein the reinforcement member comprises a bearing engagement face which at least partially surrounds the first bore, wherein the bearing engagement face is configured to engage a bearing for supporting rotation of the first shaft.

6. The engine housing assembly of claim 1, wherein the reinforcement member further comprises an oil passage arranged to allow oil to be fed to a bearing on the first or second shaft through the reinforcement member.

7. An engine assembly comprising:
an engine housing component at least partially defining a first bore for receiving a first shaft and at least partially defining a second bore for receiving a second shaft, wherein a first shaft assembly comprises a first gear wheel, and a second shaft assembly comprises a second gear wheel configured to mesh with the first gear wheel; and
a reinforcement member cast into the engine housing component, the reinforcement member having a different coefficient of thermal expansion from the housing component, wherein the reinforcement member at least partially surrounds the first and second bores,
wherein the engine housing component further at least partially defines a third bore,
wherein the reinforcement member at least partially surrounds the third bore,
wherein the third bore is configured to receive a third shaft, and
wherein the first shaft, the second shaft, and the third shaft include a crankshaft, a camshaft, and an engine balance shaft.

8. The engine assembly of claim 7, wherein the coefficient of thermal expansion of the reinforcement member is closer to a coefficient of thermal expansion of the first and second gear wheels than the coefficient of thermal expansion of the engine housing component is to the coefficient of thermal expansion of the first and second gear wheel.

9. The engine assembly of claim 7, wherein the first shaft comprises a crankshaft or a camshaft, wherein the second shaft comprises an engine balance shaft or a camshaft.

10. The engine assembly of claim 7, wherein the first gear wheel and the second gear wheel have a lower coefficient of thermal expansion than the engine housing component.

11. The engine assembly of claim 10, wherein the reinforcement member comprises a coefficient of thermal expansion closer to a coefficient of thermal expansion of the first gear wheel and the second gear wheel than the engine housing component.

12. The engine assembly of claim 7, wherein the first gear wheel, the second gear wheel, and the reinforcement member comprise a first material, and wherein the engine housing component comprises a second material, wherein the first material is different than the second material.

13. The engine assembly of claim 12, wherein the first material is steel and the second material is cast iron.

14. A method of manufacturing an engine housing assembly, the method comprising:
fabricating a reinforcement member for an engine housing component; and
fabricating the engine housing component with the reinforcement member cast into the engine housing component, wherein the engine housing component at least partially defines a first bore for receiving a first shaft and at least partially defines a second bore for receiving a second shaft, wherein the reinforcement member at least partially surrounds the first and second bores and wherein the reinforcement member has a different coefficient of thermal expansion from the engine housing component,
wherein fabricating the engine housing component further comprises casting the engine housing component over the reinforcement member and machining the outer surfaces of the engine housing component.

15. The method of claim 14, wherein the engine housing component defines a bearing structure for supporting a portion of a bearing for the first shaft, further comprising coupling a bearing cap to the engine housing component or the reinforcement member, wherein the bearing cap and the bearing structure together define the first bore.

16. The method of claim 14, wherein outer surfaces of the engine housing component are machined such that a bearing engagement surface of the reinforcement member forms an outer surface of the engine housing assembly at least partially surrounding the first or second bore.

17. The method of claim 16, further comprising coupling a bearing cap to the engine housing component or reinforcement member wherein the bearing cap and the reinforcement member together define the first bore; and machining the bearing cap and the reinforcement member to form the first bore.

* * * * *